R. ROLKERR.
COMPRESSOR.
APPLICATION FILED JAN. 4, 1918.

1,295,068.

Patented Feb. 18, 1919.
2 SHEETS—SHEET 1.

WITNESSES

INVENTOR
Retlow Rolkerr
BY
ATTORNEYS

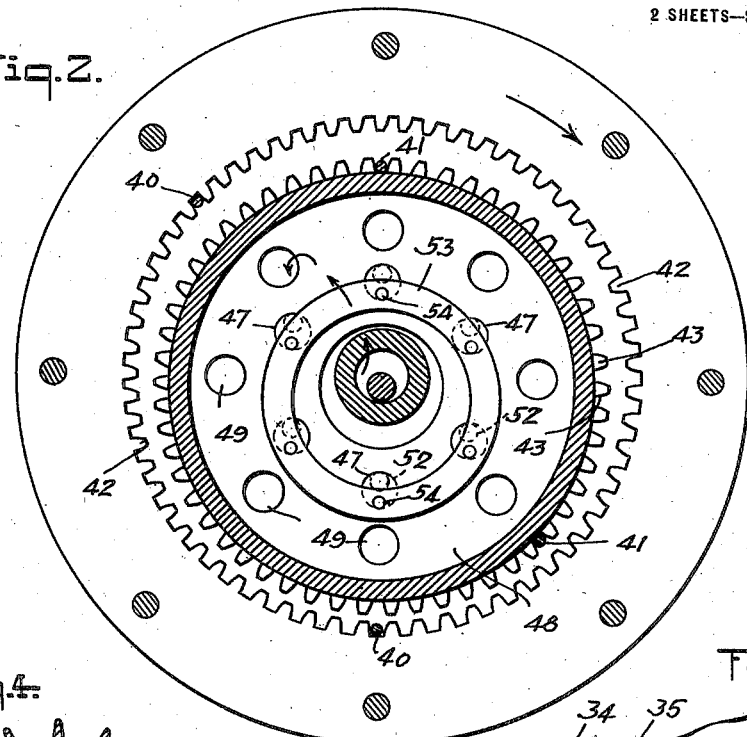
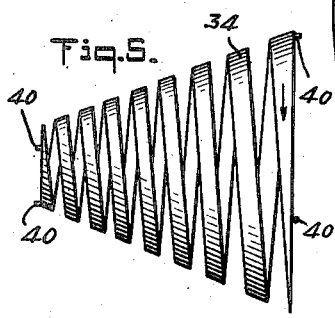
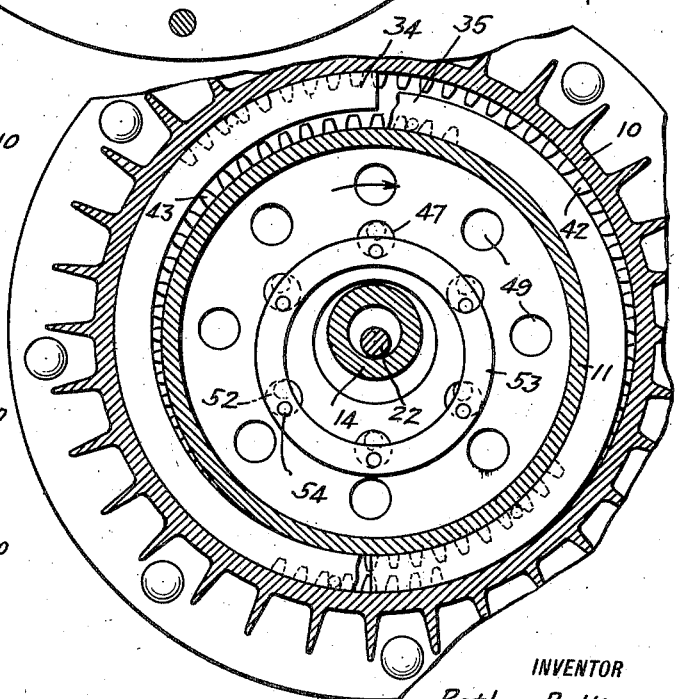
INVENTOR
Retlow Rolkerr

UNITED STATES PATENT OFFICE.

RETLOW ROLKERR, OF OAKLAND, CALIFORNIA.

COMPRESSOR.

1,295,068.

Specification of Letters Patent.

Patented Feb. 18, 1919.

Application filed January 4, 1918. Serial No. 210,312.

*To all whom it may concern:*

Be it known that I, RETLOW ROLKERR, a citizen of the United States, and a resident of Oakland, in the county of Alameda and State of California, have invented a new and Improved Compressor, of which the following is a full, clear, and exact description.

Among the principal objects which the present invention has in view are: to increase the power of compression in a machine of the character mentioned in correspondence with the increment of the resistance of the fluid being treated; to radiate the heat incident to compression; to minimize the degree of movement of the working parts of the machine; to avoid vibration in the machine; and to reduce friction on the elements of the machine.

*Drawings.*

Fig. 2 is a vertical cross section of the same, the section being taken as on the line 2—2 in Fig. 1;

Fig. 3 is a section of the same, the section being taken as on the line 3—3 in Fig. 1;

Fig. 4 is a cross section of the machine, the section being taken as on the line 4—4 in Fig. 1;

Fig. 5 is a detail view on a reduced scale, showing one of the spiral compressor elements with which the compressor is furnished.

*Description.*

Figure 1:
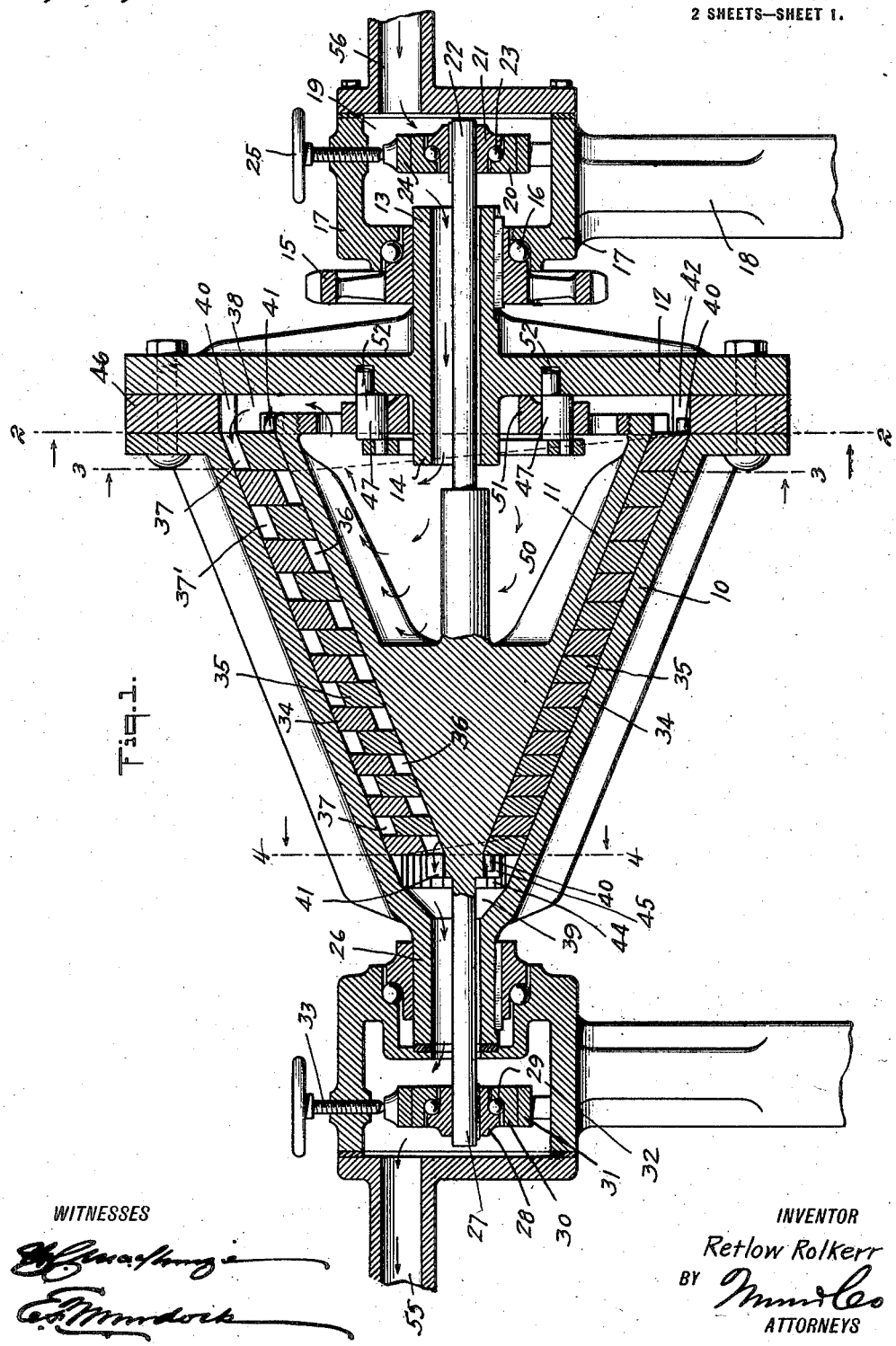
Figure 1 is a longitudinal vertical section of a compressor constructed and arranged in accordance with the present invention.

As seen in the drawings, a compressor when constructed in accordance with the present invention, has hollow cone-shaped drums 10 and 11, and the drum 11 in service is held within the drum 10. The drums are disposed in eccentric relation to each other and are independently rotatively mounted, the axes of rotation of the two drums being parallel. The drum 11 is completely inclosed within the drum 10, the said drum 10 being provided with a face plate 12 for this purpose. The face plate 12 has a tubular shaft centrally arranged and having extensions 13 and 14. The extension 14 has keyed thereon a driven gear wheel 15. The hub of the gear wheel 15 is utilized to form a portion of the race for the bearing balls 16. The companion portion of the race for the balls 16 is formed in the hub 17 of a supporting standard 18.

The head 17 is hollow to form a chamber 19, wherein a ball-bearing race block 20 is supported to form a friction-reducing bearing with the race block 21, which is keyed to the shaft 22 rigidly attached to or integrally formed with the drum 11. The race blocks 20 and 21 are tightened or relieved on the balls 23 by a crown block 24 and the hand-operated screw 25. By judicious use of shims, the blocks 20 and 21 and shaft 22 may be raised or lowered for truing the shaft 22 with the axis of the drum 10, and of the shaft 26 and that formed by the sections 13 and 14 at opposite ends of the drum 10.

When truing the shaft 22 at one end of the drum 11, a similar operation is performed for the shaft 27 at the opposite end. The shaft 27 has rigidly mounted thereon a race block 28 for the balls 29 which rest in the companion race block 30. The race block 30 is supported in a ring 31 in a chamber 32, which corresponds with the chamber 19 at the opposite end of the compressor. The blocks 28 and 30 and the shaft 27 supported thereby are primed or trued as to their operating position by the screw 33.

The shafts 22 and 27 are trued until at one point the outer surface of the drum 11 is separated from the inner surface of the drum 10 a distance equal to the thickness of the two tapered spiral coils 34 and 35. Each of the coils 34 and 35 is shaped substantially as shown in Fig. 5 of the drawings, the convolutions of the said coils being spaced to receive snugly therebetween the convolutions of the companion coil. As shown in Fig. 1, the result of this arrangement is that on a central plane, the passage between the two drums is completely and hermetically sealed. As shown in said Fig. 1, the coil 34 completely fills and conforms to the shape of the inner surface of the wall of the drum 10, while the coil 35 corresponds with the shape and size of the drum 11. The coils 34 and 35 are preferably constructed from resilient material and are so set that they lightly press each the drum with which it corresponds. That is to say, the coil 34 is set to slightly expand to maintain a light but constant outward pressure against the inner wall of the drum 10, while the coil 35 is set to slightly contract, to bear lightly on the outer surface of the drum 11.

As a result of this construction, there extends around the drums, a series of spirally shaped chambers 36 and 37. Said chambers are diminished in width and diameter in correspondence with the convolutions of said coils, and air or other fluid introduced thereto from the chamber 38 adjacent the face plate 12, is delivered therefrom to the chamber 39 at the diminished or contracted ends of the two drums. By reference to Fig. 1, the progressive contraction of the chambers 36 and 37 may be seen.

When it is understood that the diameter of the chambers 37 are contracted in correspondence with the coils, such as shown in Fig. 5, it will be seen that the cubic contents of the receiving or first of the series of chambers is much greater than the cubic contents of the delivering or last chambers adjacent the delivery chamber 39. As the same mass of air or fluid received in the receiving chambers is contained in the last of the chambers 37, the mass is reduced by being greatly compressed.

For the perfect working of the compressor, it is necessary that the coils 34 and 35 should be maintained in their proper relation. To this end, the coils are furnished with pins 40 and 41. The pins 40 and 41 are laterally extended to engage gear-like serrations 42 and 43, 44 and 45, respectively. The serrations 42 are cut on the inner edge of a following ring 46. The serrations 43 are extended from the edge of the lower end of the drum 11. The serrations 44 are internally extended from the drum 10 at the lower end thereof, while the serrations 45 are cut or formed on the smaller end of the drum 11. The pins 40 and 41 are placed between the serrations, as shown best in Fig. 2 of the drawings. This attachment while not interfering with the expansion and contraction of the coils, prevents the creep of the coil due to any consequent friction which might develop on the drums 10 and 11.

To synchronize the movement of the two drums and accommodate the eccentric arrangement thereof, the drums are operatively connected by dowels 47. The dowels 47 are extended through perforations in a face plate 48. The plate 48 is furnished with a series of air passages 49, which establish communication between the tubular passage through the extensions 13 and 14 of the supporting shaft of the drum 10. The chamber 50 inside the drum 11 and the chamber 38 which communicates with the chambers 36 and 37. A hub 51 is formed on the plate 48, having a contracted bearing edge, which has a bearing surface on the face plate 12 to provide for the relative movement of the drums 10 and 11, or of the drum 11 on the face plate 12. The movement of the two drums above referred to corresponds with the maximum separation of the coils 34 and 35 from the drums 11 and 10, respectively. Also the movement of the two drums corresponds with the offset of the axes of the dowels 47, and the dowel pins 52 thereof. The dowels 47, as seen best in Fig. 2 of the drawings, are operatively connected by a floating ring 53. The ring 53 is pivotally connected with the dowels by means of offset pins 54. The result of this connection is that as the drum 10 and face plate 12 thereof are rotated about their center, the drum 11 is correspondingly rotated about its center, while the connecting elements, to wit, the dowels 47, gyrate about the center of the pins 52 with a planetary movement. In this manner, the axial relation between the drums 10 and 11 is maintained constant, while said drums rotate carrying therewith the coils 34 and 35, the progressive sections of which are alternately contracted and expanded progressively, with the result that the air or other fluid trapped thereby is gradually moved from the receiving end of each coil or of the chambers 37 and 36 thereof toward the delivery end or to the chamber 39, to be delivered thence by way of the delivery pipe 55.

From the foregoing, it will be understood that if air is introduced at the inlet pipe 56, it is delivered from the pipe 55 at a pressure corresponding with the reduction in volume of said air.

*Claims.*

1. A compressor comprising a plurality of helical members of different diameters, the convolutions whereof are interleaved; and means for maintaining the convolutions in line to interrupt chambers formed by said helical members, said means embodying an enfolding casing, and means for rotating said helical members in unison.

2. A compressor comprising a conical member forming a compression chamber, the walls whereof are spaced apart; a helical member disposed between said walls to form a helical space between the walls of said chamber; means for interrupting said space for forming non-communicating helical sector chambers; and means for rotating said helical member for progressively transferring the contents of each sector chamber from the enlarged end of said chamber to the contracted end thereof.

3. A compressor comprising a conical member forming a compression chamber, the walls whereof are spaced apart; a helical member disposed between said walls to form a helical space between the walls of said chamber; means for interrupting said space for forming non-communicating helical sector chambers, said means embodying a second helical member eccentrically disposed in interleaved relation to the first-mentioned member; and means for rotating said helical members correspondingly.

4. A compressor comprising a conical member forming a compression chamber, the walls whereof are spaced apart; a helical member disposed between said walls to form a helical space between the walls of said chamber; means for interrupting said space for forming non-communicating helical sector chambers, said means embodying a second helical member eccentrically disposed in interleaved relation to the first-mentioned member; and means for rotating said helical members correspondingly for maintaining the bodies of said members alined on the plane of coincidence of the helices.

5. A compressor comprising a plurality of circumfolded conical drums of different diameters; mountings for said drums arranged to hold the axes of said drums in eccentric parallel relation; a plurality of circumfolded helical coils, each of said coils being fitted to one of said drums; means operatively connecting each of said coils to the drum to which it is fitted; and means for rotating said drums and coils in unison.

6. A compressor comprising a plurality of circumfolded conical drums of different diameters; mountings for said drums arranged to hold the axes of said drums in eccentric parallel relation; a plurality of circumfolded helical coils, each of said coils being fitted to one of said drums; means operatively connecting each of said coils to the drum to which it is fitted; and means for rotating said drums and coils connected therewith in correspondence for synchronizing the movement of said coils on the line where both coils engage both drums.

7. A compressor comprising a plurality of circumfolded conical drums of different diameters; mountings for said drums arranged to hold the axes of said drums in eccentric parallel relation; a plurality of circumfolded helical coils, each of said coils being fitted to one of said drums, the radial dimension of the body of said coils being equal and corresponding with the separation between said drums on the plane of closest approximation thereof; means operatively connecting each of said coils to the drum to which it is fitted; and means operatively connecting said drums and coils for synchronizing the movement of said drums and coils on the plane of the juxtaposition of the said drums where said coils form a complete laminated wall lengthwise between said drums.

RETLOW ROLKERR.